United States Patent
Jacobs

(10) Patent No.: US 8,042,493 B2
(45) Date of Patent: Oct. 25, 2011

(54) CONTAINMENT VESSEL FOR TEETHING AND EATING

(76) Inventor: Laura M. Jacobs, New York, NY (US)

( * ) Notice: Subject to any disclaimer, the term of this patent is extended or adjusted under 35 U.S.C. 154(b) by 232 days.

(21) Appl. No.: 12/080,603

(22) Filed: Apr. 4, 2008

(65) Prior Publication Data
US 2008/0314332 A1    Dec. 25, 2008

Related U.S. Application Data

(60) Provisional application No. 60/921,775, filed on Apr. 4, 2007.

(51) Int. Cl.
A01K 29/00    (2006.01)
(52) U.S. Cl. ......................................... 119/709; 606/235
(58) Field of Classification Search ............... 119/51.01, 119/71, 65, 702, 707, 709, 710, 711; 224/409, 224/411, 420, 572, 191, 199, 620, 677, 658, 224/236, 600; 383/95, 86, 78, 117, 22, 24
See application file for complete search history.

(56) References Cited

U.S. PATENT DOCUMENTS

| | | | | |
|---|---|---|---|---|
| 3,221,444 A * | 12/1965 | Hettinga | ........................ | 446/397 |
| 3,742,950 A * | 7/1973 | Endrody | ........................ | 215/11.1 |
| 3,949,916 A * | 4/1976 | Yount | ........................ | 224/240 |
| 4,434,921 A * | 3/1984 | Santhoff | ........................ | 224/674 |
| 4,512,504 A * | 4/1985 | Owlett | ........................ | 224/572 |
| 4,637,534 A * | 1/1987 | Leppek | ........................ | 224/439 |
| 4,742,799 A * | 5/1988 | Schlitz | ........................ | 119/707 |
| 5,040,711 A * | 8/1991 | Niederhauser et al. | ....... | 224/572 |
| 5,238,305 A * | 8/1993 | Feller | ........................ | 383/22 |
| D352,260 S * | 11/1994 | Adamo | ........................ | D12/133 |
| 5,364,348 A | 11/1994 | Berry, Sr. | | |
| 5,908,440 A * | 6/1999 | McCloskey et al. | .......... | 606/234 |
| 6,524,272 B1 | 2/2003 | Berry, Sr. | | |
| 6,640,343 B2 * | 11/2003 | Peters | ........................ | 2/247 |
| 7,901,375 B2 * | 3/2011 | Dunn et al. | ........................ | 604/77 |
| 2003/0233121 A1* | 12/2003 | Keller | ........................ | 606/235 |
| 2005/0004603 A1* | 1/2005 | Desousa et al. | ........................ | 606/235 |
| 2006/0142800 A1 | 6/2006 | Charameda et al. | | |
| 2007/0203450 A1* | 8/2007 | Berry | ........................ | 604/77 |
| 2007/0234969 A1* | 10/2007 | Lynch | ........................ | 119/707 |

FOREIGN PATENT DOCUMENTS
WO    WO 2005002493 A1 *    1/2005
* cited by examiner

Primary Examiner — Timothy D Collins
Assistant Examiner — Joshua Huson
(74) Attorney, Agent, or Firm — Cozen O'Connor

(57) ABSTRACT

A containment vessel for teething and feeding includes an elongate object having axially opposed end portions and a central portion extending between the end portions, and a mesh pouch attached to the central portion. The pouch has an opening, which can be closed when the pouch is attached to the elongate object. The pouch can have a flap which is wrapped around the central portion and attached to the pouch prior to placing an object in the bag and closing the opening. In an alternative, the opening of the pouch is captured between inside surfaces of a two-part object. The elongate object preferably resembles a bone, the vessel being especially suitable for dogs.

9 Claims, 6 Drawing Sheets

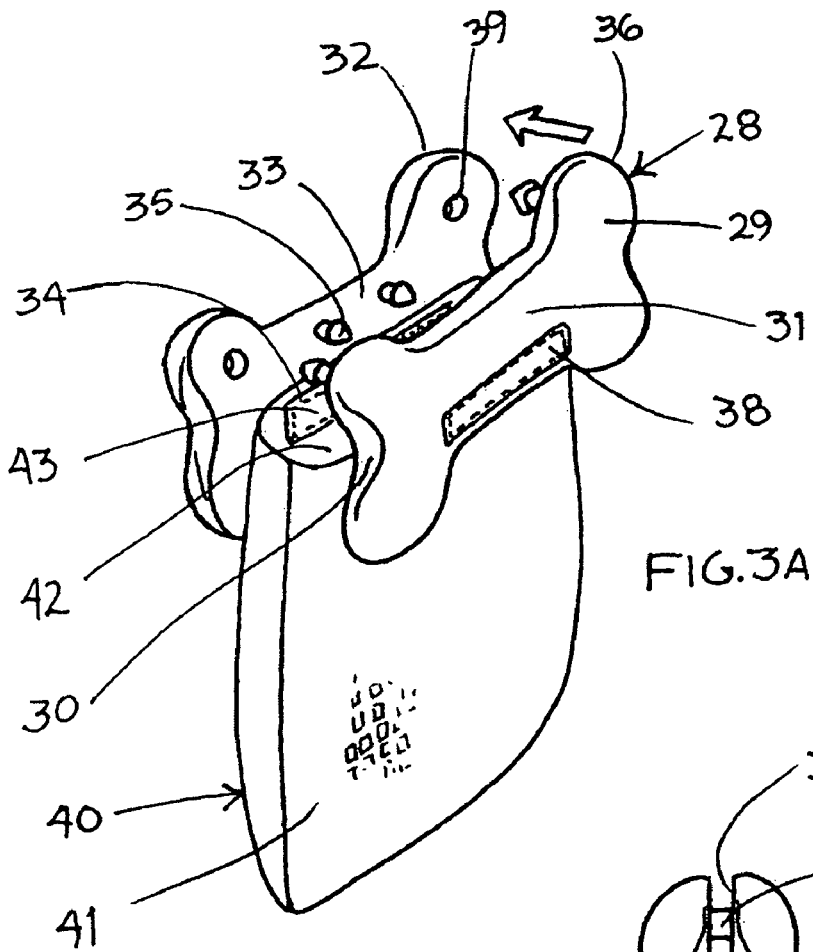
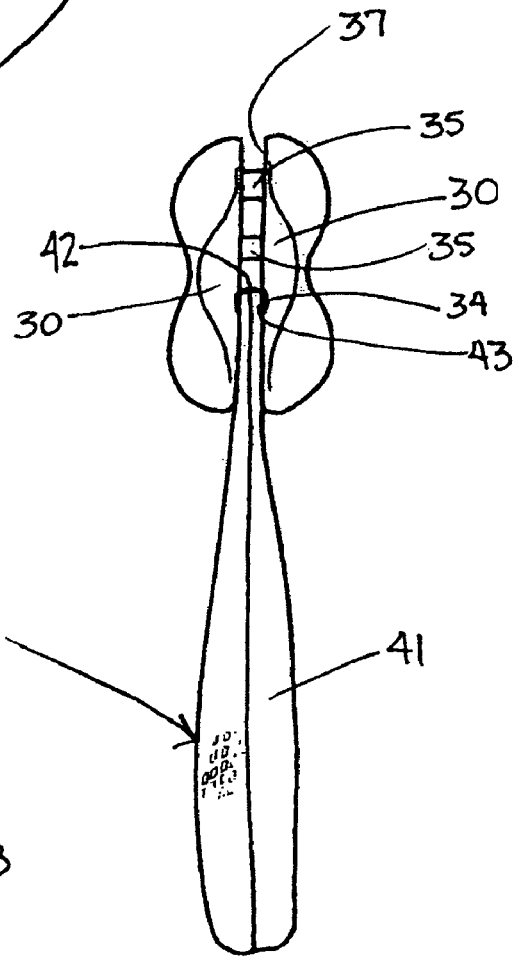

CONTAINMENT VESSEL FOR TEETHING AND EATING

CROSS-REFERENCE TO RELATED APPLICATIONS

This application claims priority under 35 U.S.C. §119(e) from U.S. Provisional Application No. 60/921,775, filed on Apr. 4, 2007.

BACKGROUND OF THE INVENTION

1. Field of the Invention

Porous vessel used for animals as a vehicle for oral hygiene, to extend consumption time of comestibles, offer activity of interest, and prevent choking.

2. Description of the Related Art

U.S. Pat. No. 5,364,348 discloses a feeder with a mesh bag for containing comestibles for consumption by a human baby. The bag is received over external threads on a handle member, and held in place by a ring having internal threads. There are only two parts in addition to the bag.

U.S. Pat. No. 6,524,272 discloses a similar feeder, but here the bag is trapped between concentric ring portions, and a handle having a threaded plug is screwed into the inner ring portion to tighten the outer ring portion against the bag. Here there are three parts in addition to the bag.

US 2006/0142800 discloses another feeder for a human baby, which once again uses a bag trapped by threaded members, and a total of five parts in addition to the bag.

In each of the above cases, the handle is formed as a ring for gripping by an infant, and would be less than optimal for gripping by a dog, who has not been blessed with thumbs.

In order to provide a similar teething and eating experience for a dog, it would be desirable to provide a containment vessel designed for holding against the ground with forepaws while chewing on the mesh bag. It would also be desirable to provide this vessel with as few parts as possible.

SUMMARY OF THE INVENTION

According to the invention, a containment vessel for teething and feeding includes an elongate object having axially opposed end portions and a central portion extending between said end portions, and a mesh pouch attached to the central portion, wherein the pouch has an opening, which is closed by attaching the pouch to the elongate object.

According to a preferred embodiment, the central portion has a smaller cross-section than the end portions, so that the object is shaped like a bone. The pouch is provided with a flap which can be wrapped around the central portion and received in an opening of the pouch, where it is retained by hook and loop fasteners.

According to another preferred embodiment, the elongate object ("the bone") is in two parts which are snapped together along a central plane to close the opening of the pouch. The pouch may be fixed to the bone parts so that assembling a plurality of parts isn't necessary when closing the pouch.

A consumable object that is edible, chewable, lickable, or suckable (a comestible) can be placed into this vessel and will regulate the rate of consumption by creating a barrier between the animal and the comestible. The vessel must be too large to fit completely in the mouth, and must be sized and shaped to avoid choking on. The barrier may vary by pore size, shape, & dimension and may be dynamic or static in nature. The material that creates the pores must have a distinct level of durability to withstand the dog's zeal in accessing the comestible. This can be achieved by appropriate choice of materials, like plastic, nylon, rubber, leather, cotton, kevlar, textile mesh, molded netting, and dye cut rubber. It can come in various forms such as sack/bag/vessel consisting entirely of the mesh material, or it can be joined to other material for structure, as a safety measure to prevent swallowing, and to provide a grip for handling. A particularly suitable mesh is woven of nylon to produce a surface which is at least 50% holes, wherein the holes have a dimension of at least 2 mm, in order to permit release of food particles during mastication.

If the pet is given a treat without a bag, it can be chewed/swallowed immediately. If the treat is enclosed in the mesh, it slows consumption time, allowing only smaller portions of the treat to be consumed by licking, chewing and gnawing. It helps prevent weight gain. It also scrubs teeth, massages gums, and occupies the dog's interest, providing entertainment for longer periods of time. Brain activity is stimulated as the dog works to get the treat.

Pets have been know to choke on comestibles by swallowing too large a portion. This can cause medical complications or fatality. The vessel prevents this from occurring by only allowing small portions of edible matter to pass through. If chewing rawhide or a pizzle stick, the animal can still chew, gnaw, and lick the object, but it is completely retained by the porous material so no larger part may be released. Many variations can exist to properly contain the products used—i.e., large dog, large bone, larger mesh openings vs. small dog with small kibble using smaller mesh openings.

The vessel can easily be cleaned in a clothes washer, dishwasher, or sink. It is reusable and resealable. It can use any existing treat that fits into containment: bones, rawhides, chew pizzle-sticks, cookies, dried food, etc. The bag can also be chewed on with wet food, peanut butter, or teeth cleaning aids spread onto porous material or vessel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3A is a perspective of a second embodiment of containment vessel according to the invention;

FIG. 3B is an end view of the vessel in FIG. 3A;

DETAILED DESCRIPTION OF THE PRESENTLY PREFERRED EMBODIMENTS

Figure 1A:
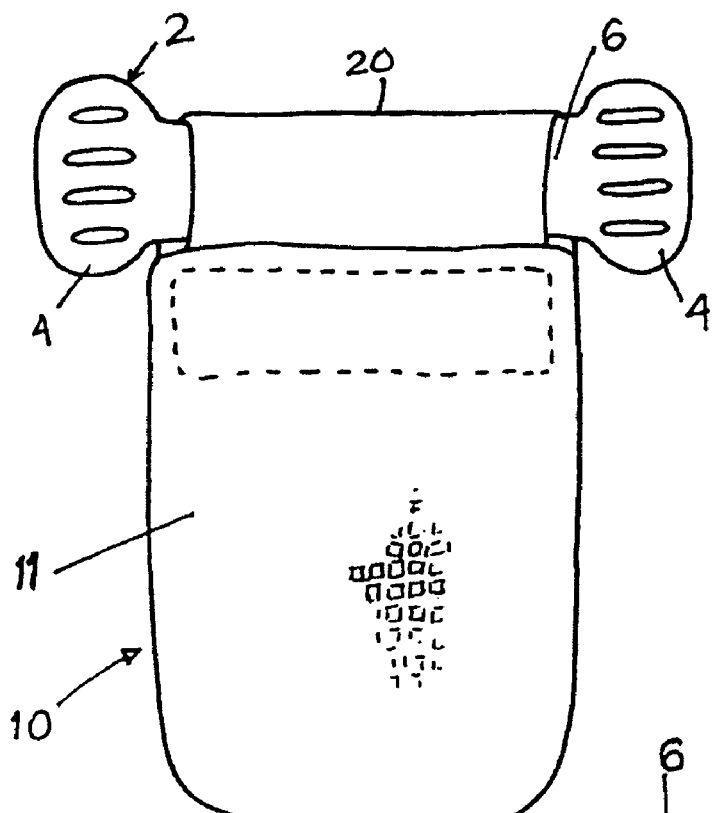
FIG. 1A is an elevation view of a first embodiment of containment vessel according to the invention.
Figure 1B:
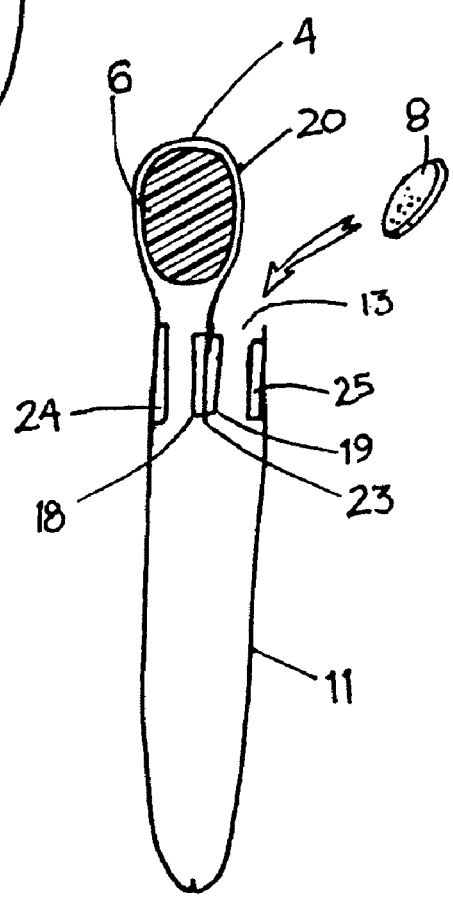
FIG. 1B is an end cross-section of the vessel in FIG. 1A.

FIGS. 1A and 1B show a pouch 10 attached to an elongate object 2 having opposed axial end portions 4 and a central portion 6 extending between the end portions 4. The central portion 6 has a smaller cross-sectional area, as taken transversely to the long axis of the object, than the end portions 4. The object 2 is therefore bone-shaped, the end portions representing knuckles of a joint, and will hereinafter be referred to as the bone. This shape not only simulates a popular treat for a dog, but also provides a retaining function for the mesh pouch 10, and further provides means for a dog to grip the vessel by putting his front paws on respective end portions 6 while he chews the pouch to release the comestible 8 through the mesh.

The pouch 10 has a body portion 11 and a retaining flap 20 which is wrapped around the central portion 6 of object 2. As best seen in FIG. 1B, the top edge 23 of the flap 20 is received in the opening or mouth 13 of the body portion 11, where it is secured by hook and loop strips 18, 19, 24, 25, as will be described. Comestibles 8 may be placed in the pouch prior to closing the opening 13.

Figure 2A:
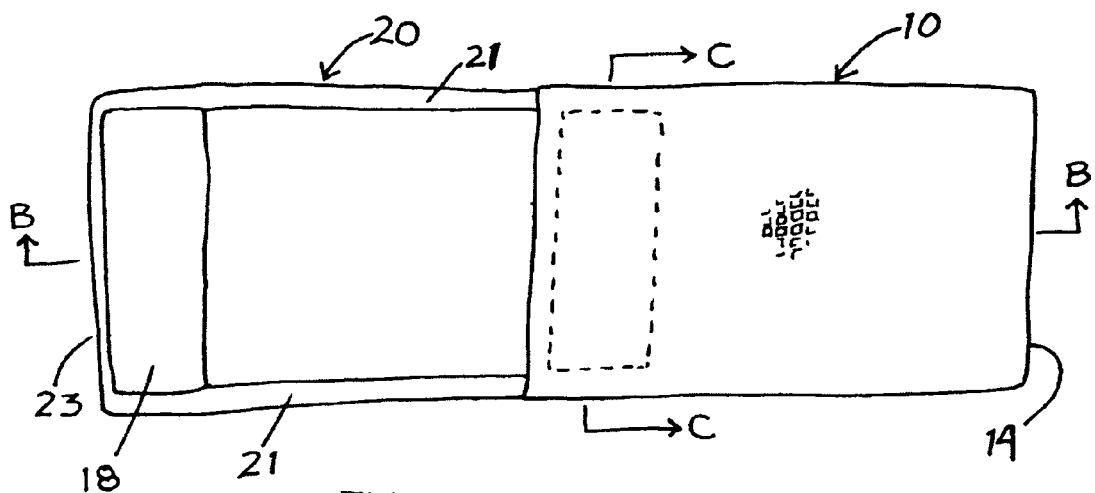
FIG. 2A is a plan view of a pouch with an enclosed seam and a retainer flap.
Figure 2B:
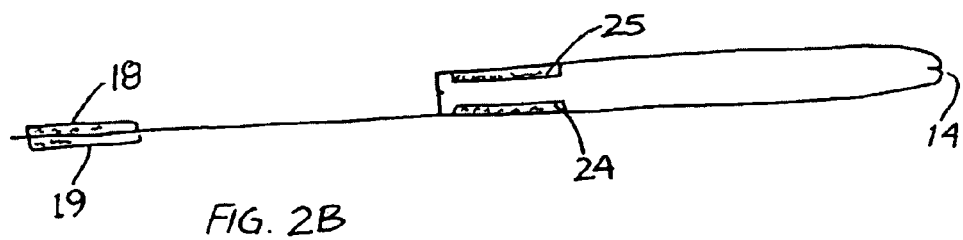
FIG. 2B is a cross-section taken along line B-B of FIG. 2A.
Figure 2C:
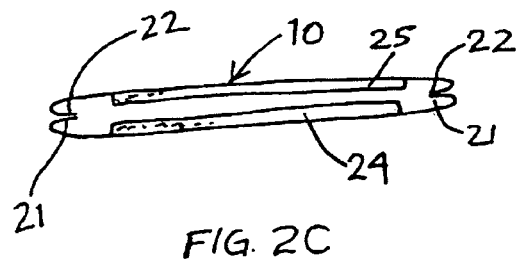
FIG. 2C is a cross-section taken along line C-C of FIG. 2A.

FIGS. 2A-2C show the pouch 10 in greater detail. The body portion 11 and retaining flap 20 are formed by folding an elongate piece of mesh material over on itself along bottom 14. The flap 20 has opposed lateral edges 21 which are folded over and stitched to form bindings. A hook strip 18 is sewn onto the inside of the flap 20 adjacent to the top edge 23, and another hook strip 19 is sewn onto the outside of the flap.

Loop strips 24, 25 are sewn on the same side of the mesh material, so that they are opposed when the material is folded along bottom 14. Each edge 21 is stitched to an adjacent edge 22 to form seams along opposite lateral edges of the pouch. The pouch is then turned inside out, so that the seams are enclosed the loop strips 24, 25 come into facing relationship, with the strip 25 adjacent to the lip 13 which forms part of the opening.

To attach the rubber bone of FIG. 1A, it is laid against the flap 20 between the strips 18, 24, whereupon flap 23 is inserted into the pouch so that the hook strip 18 can engage loop strip 24.

After an edible treat is placed in the pouch 20, the loop strip 25 is pressed against the hook strip 19. Since dogs have very limited digital dexterity, it is virtually impossible for them to open the pouch, so they will generally settle for chewing on it. During use, and perhaps in an attempt to open the pouch, a dog will tend to work the bone with his paws. After use, the synthetic bone may be removed by a human for ease in washing.

While other hook and loop combinations are possible, it is preferable for the strips 24, 25 to both be loops so they do not engage each other when the flap is out of the pouch.

FIGS. 3A and 3B show a bone 28 which once again has end portions 29 with a larger cross-sectional area than the central portion 31, but is formed in two parts 32, 36 which are joined along the longitudinal axis of the bone. The first part 32 has an inside surface 33 with a groove 34 and plugs 35. The second part 36 has an inside surface 37 with a groove 38 and sockets 39 which receive the plugs 35 in an interference fit or a snap fit. The mesh pouch 40 has a body portion 41 with an opening 42 surrounded by a bead 43 which is sewn in place. The lateral sides of the body portion are joined substantially as shown in FIGS. 2A-2C. To assemble the mesh pouch 40 to the bone 28, the bead 43 is aligned with one of the grooves 34, 38, and the plugs 35 are snapped into sockets 39 as the bead 43 is received in the opposing groove. This closes the opening 42 and contains the comestible in the pouch. An indention 30 is provided in at least one of the ends 29 to assist in separating the parts 32, 36 using a thumb or any handy tool. It is also possible to mold or stitch the bead into the bone parts so that it is permanently attached, the pouch 40 providing the only connection between the two bone parts 32, 36.

Figure 4A:
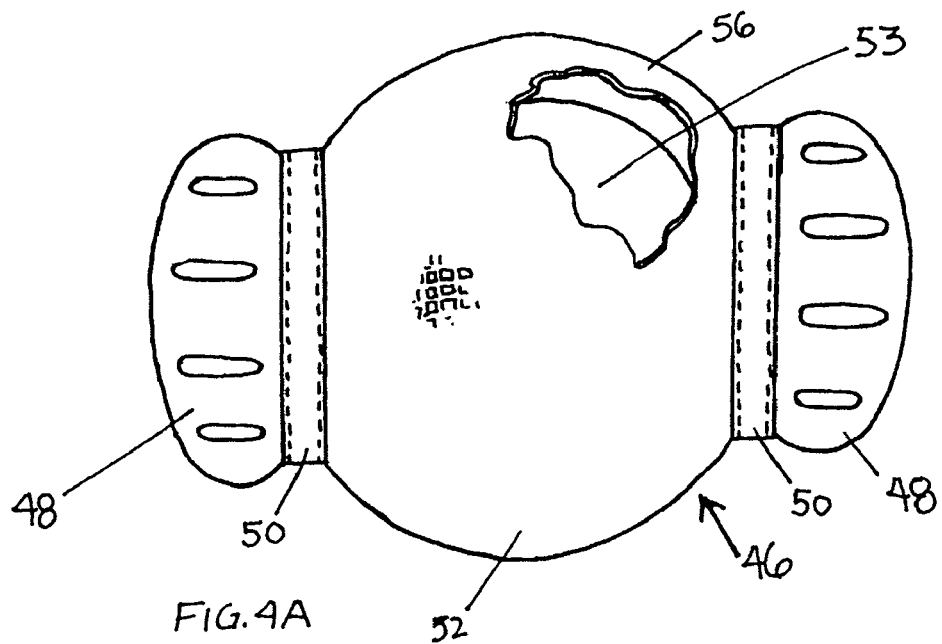
FIG. 4A is a plan view of a third embodiment of containment vessel according to the invention.
Figure 4B:
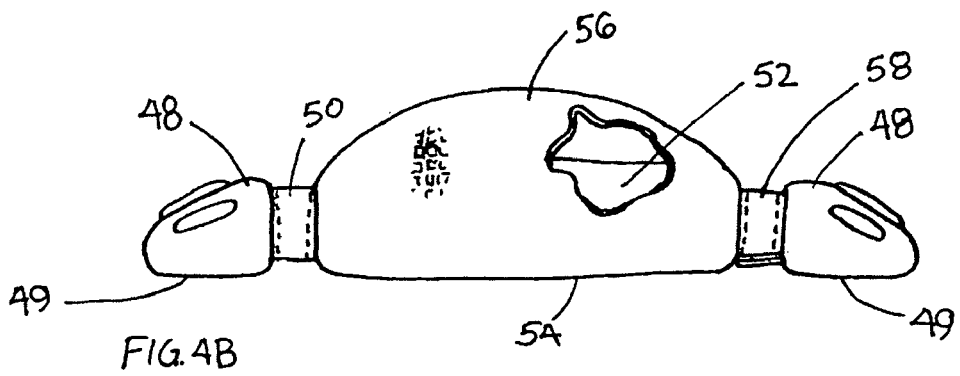
FIG. 4B is an elevation view of the vessel of FIG. 4A.

FIGS. 4A and 4B show a containment vessel including an elongate object 46 and a mesh pouch 56. The object 46 has opposed axial end portions 48 and a central portion 52 extending between the end portions 48, but here the central portion 52 has a larger dimension, taken transversely to the long axis of the object, than the end portions 48. The central portion 52 is formed with a bowl 53, and is separated from the end portions 48 by necks 50 which provide securing areas for the mesh pouch 56. As best seen in FIG. 4B, the end portions 48 have flat surfaces 49 which are coplanar with a flat surface 54 facing oppositely from the bowl. A dog can therefore stabilize the containment vessel by putting his/her paws on the end portions while he chews comestibles in the bowl 53 through the pouch 56.

Figure 4C:
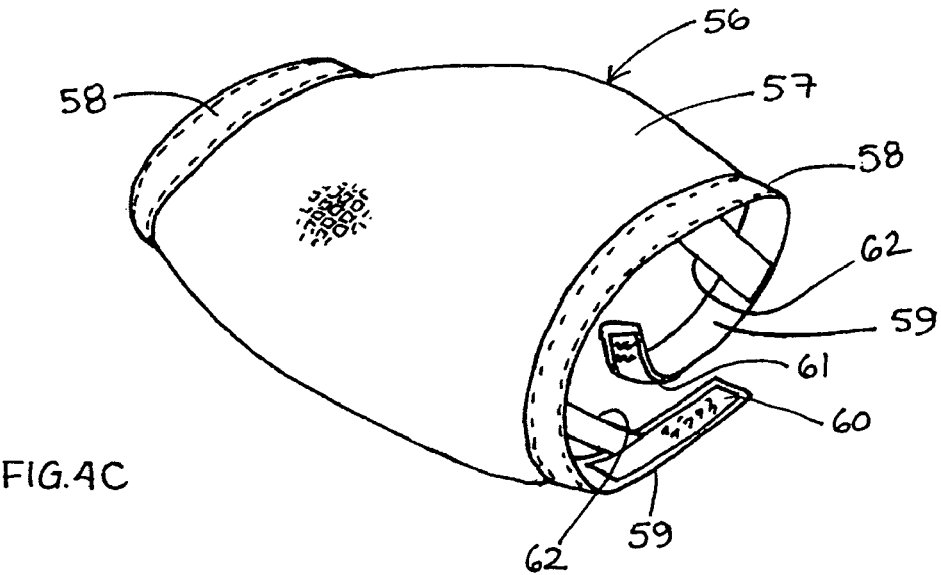
FIG. 4C is a view of the mesh pouch in FIGS. 4A and 4B.

Referring to FIG. 4C, the mesh pouch 56 comprises a sheet 57 of mesh material having closing straps 58 sewn to opposite edges. At least one of straps 58 has a pair of extensions 59 which are provided respectively with a hook strip 60 and a loop strip 61. To simplify manufacture, one of the straps is a closed loop which has enough elasticity to fit over an axial end, and is drawn against the bowl. The other strap 59 is wrapped around the neck 50 and secured by joining the hook strip 60 to the loop strip 61. While the perpendicular edges 62 are shown spaced apart, these can be designed to overlap by using a larger mesh sheet 57, and providing additional hook and loop strips. Where edges 62 overlap, one of the extensions 59 can be eliminated.

Figure 5A:
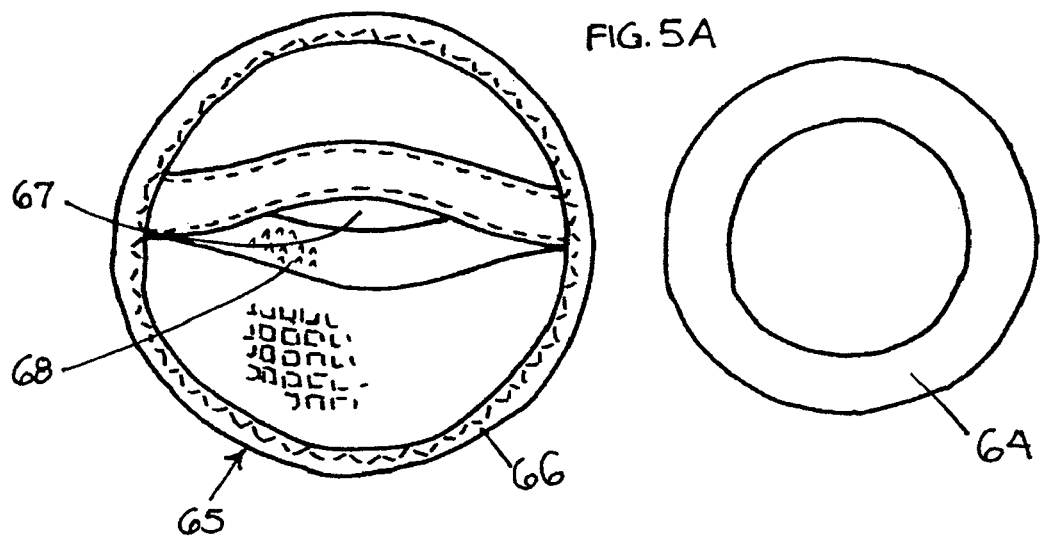
FIG. 5A is an exploded perspective of a fourth embodiment of containment vessel.
Figure 5B:
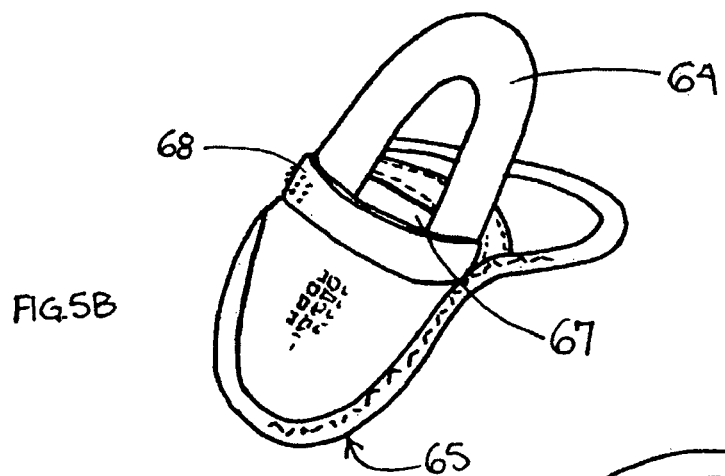
FIG. 5B is a perspective showing the assembly procedure for the vessel of FIG. 5A.
Figure 5C:
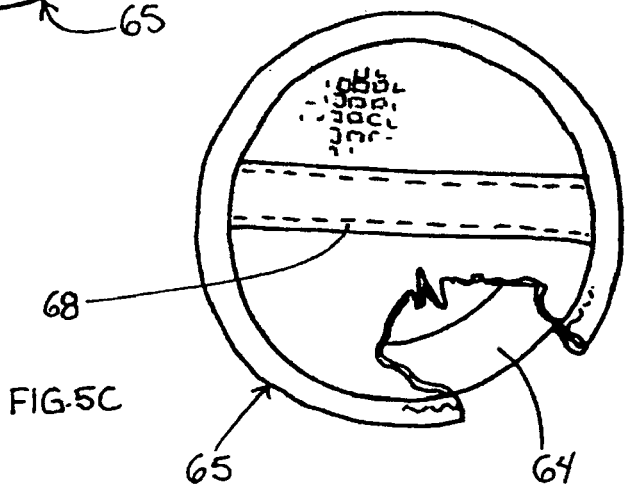
FIG. 5C is a perspective of the finished vessel.

FIGS. 5A-5C show an embodiment of containment vessel using a rubber ring 64 which is received snugly inside of mesh pouch 65 having an opening 67 with an overlapping hook and loop closure 68. The pouch 65 is preferably made of pieces stitched together about a circular edge using a hem strip 66.

Figure 6A:
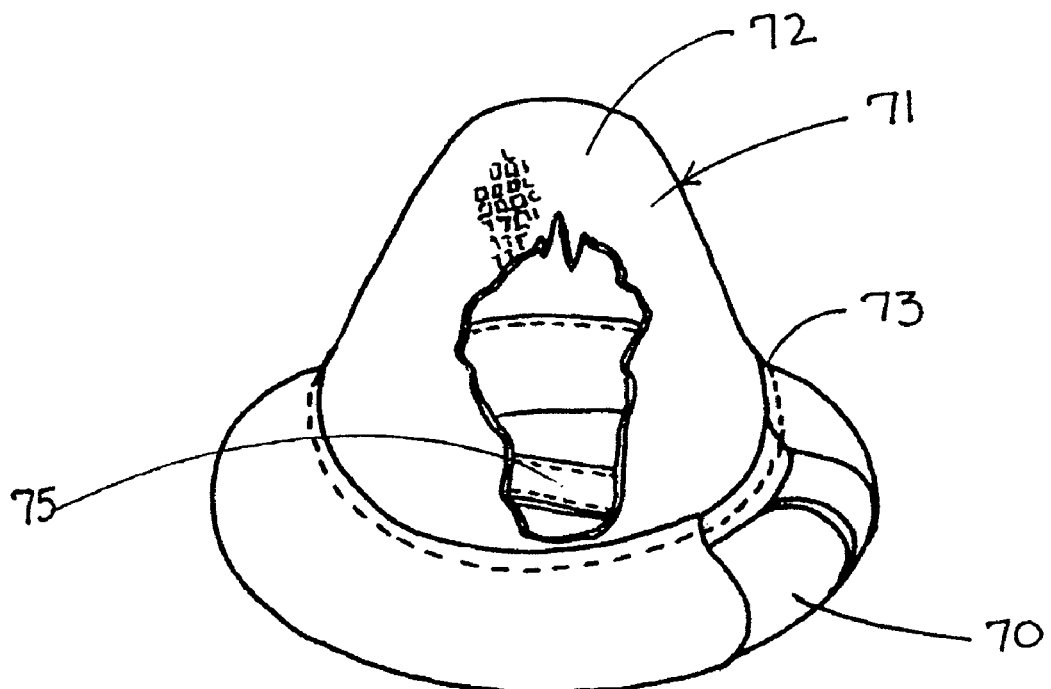
FIG. 6A is a top perspective of a sixth embodiment.
Figure 6B:
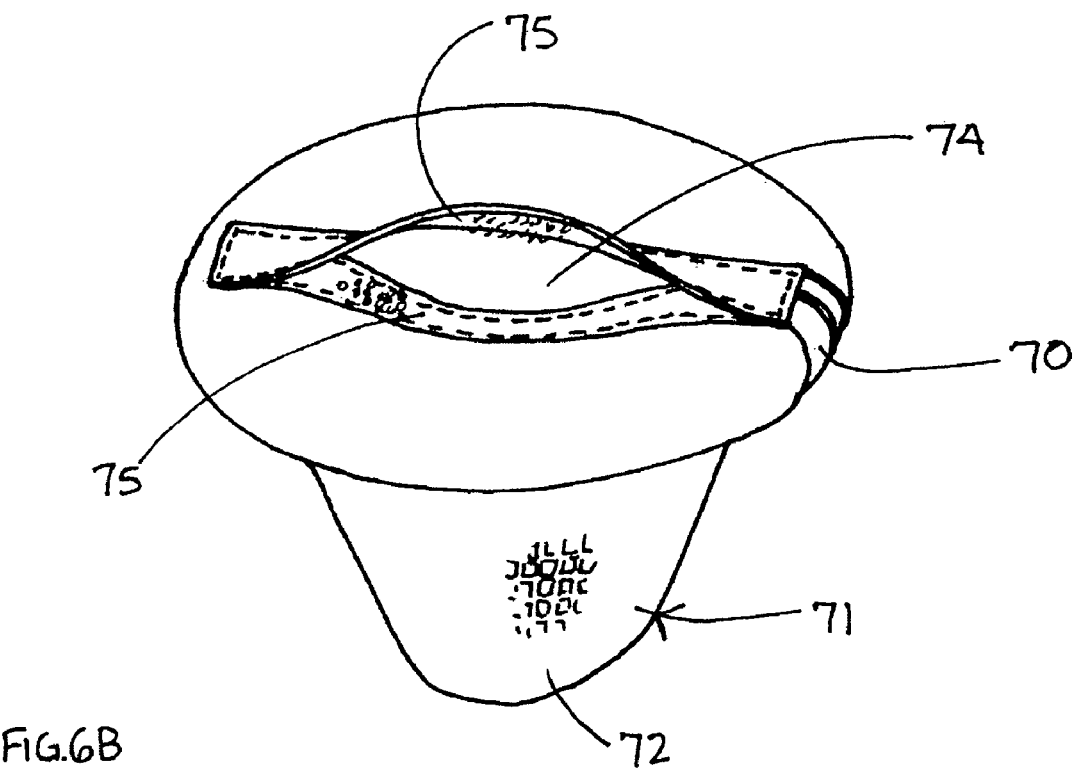
FIG. 6B is a bottom perspective of the sixth embodiment.

FIGS. 6A-6B show a related embodiment using a rubber ring 70 and a mesh pouch 71 formed with a bulge 72, but here the rubber ring is stitched in place along seam 73 where the edge of a single piece of material is wrapped around the ring 70. The pouch 71 has an opening 74 which is closed by joining overlapping hook and loop fasteners 75.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A combination teething and feeding apparatus for animals comprising:
   an elongate object having a long axis, axially opposed end portions, and a central portion extending between said end portions; and
   a mesh pouch having a flap attachable to said central portion of said elongate object to attach the pouch to the elongated object, at least said axially opposed end portions being exposed from said pouch,
   wherein said pouch has an opening which can be closed when said pouch is attached to said elongate object, and
   wherein said flap has a free end concealed in the opening when the opening is closed.

2. The containment vessel of claim 1 wherein said central portion has a smaller cross-sectional area, transverse to the long axis, than said end portions.

3. The containment vessel of claim 2 wherein said pouch comprises a body portion, said flap being adjacent to said opening and passing around said central portion, said free end of said flap being attachable to said body portion to attach said pouch to said elongate object, said end portions preventing said elongate object from being withdrawn from said flap.

4. The containment vessel of claim 3 wherein said pouch has one of a first hook strip and a first loop strip on said body portion inside said opening, and the other of a first hook strip and a first loop strip on said flap, wherein said first hook strip engages said first loop strip to attach said elongate object to said pouch.

5. The containment vessel of claim 4 further comprising one of a second hook strip and a second loop strip on said flap, facing oppositely from said one of said first hook strip and said first loop strip, and the other of a second hook strip and a second loop strip on said body portion inside said opening, facing the other one of the first hook strip and the first loop strip inside said opening, whereby said second hook strip can engage said second loop strip to close said opening when said pouch is attached at said elongate object.

6. The containment vessel of claim 5 wherein said first and second loop strips are provided in mutually facing relationship inside said opening, and said first and second hook strips are provided on opposite surfaces of said flap.

7. The containment vessel of claim 1 wherein said mesh is formed of a material having a surface which is at least 50% through holes, wherein said through holes have a diameter of at least 2 mm.

8. The containment vessel of claim 1 wherein said flap is removably attached to said elongate object.

9. The containment vessel of claim 1 wherein said opening of the pouch can be opened and closed when said pouch is attached to said elongated object without releasing the attachment of said pouch from said elongate object.

* * * * *